Jan. 4, 1955  C. M. EASON  2,698,676
AIR OPERATED BRAKE MECHANISM
Filed April 29, 1953  2 Sheets-Sheet 2

INVENTOR.
Clarence M Eason,
BY Brown, Jackson,
Boettcher & Dienner
attys

United States Patent Office 2,698,676
Patented Jan. 4, 1955

2,698,676

AIR OPERATED BRAKE MECHANISM

Clarence M. Eason, Waukesha, Wis., assignor to Industrial Clutch Corporation, Waukesha, Wis., a corporation of Wisconsin Application April 29, 1953, Serial No. 351,858

15 Claims. (Cl. 188—170)

The present invention relates to air operated brake mechanism. In the preferred embodiment herein disclosed, the invention has particular application to compressed air operated friction brakes of the industrial type, such as are used for the control of forming presses, punch presses, dieing machines, and the like.

One of the objects of the invention is to provide such a brake mechanism which is extremely simple in its construction, having a minimum or irreducible number of parts. This enables my improved brake mechanism to be manufactured and sold at a lower cost than conventional brake mechanisms now on the market.

Brake mechanisms of this general type are usually spring-actuated in one direction and compressed-air operated in the other direction. The spring actuation is generally effected by compression springs, which have relatively high compression pressures set up therein in the original assembly of the brake. In most of the air operated friction brake mechanisms of the prior art, it has been necessary to release these compression springs in order to perform certain servicing operations on the mechanism, such as renewing the friction facing material on the friction brake surfaces, or renewing the packing or sealing rings between the relatively slidable piston and cylinder. The operation of restoring the spring pressures in these compression springs in the reassembly of the mechanism after such servicing operation can present formidable difficulties in the absence of the necessary shop equipment for initially establishing the compression spring pressures.

In this regard, one of the objects of the invention is to provide an improved construction of air operated friction brake mechanism wherein the friction facing material can be inspected, cleaned or renewed without releasing the initial spring pressures of the compression springs. This is made possible by a unique relation of parts wherein the compression springs are confined between the non-rotating shiftable brake plate and the head of the compressed air cylinder, and wherein relative separating movement between such brake plate and cylinder is limited by the piston which is disposed in the cylinder outwardly of the cylinder head and is operatively attached to such brake plate through a central aperture in the cylinder head. Thus, the sub-assembly consisting of the shiftable non-rotating brake plate, the compressed air cylinder, the compression springs interposed therebetween, and the outwardly disposed piston, can be readily removed as a unit package for the purpose of renewing the friction brake surfaces, without releasing or disturbing the spring pressures initially established in the compression springs.

In this same regard, another object of the invention is to provide an improved air operated friction brake mechanism wherein the sealing or packing rings carried by the piston can be inspected, cleaned or renewed without releasing or disturbing the spring pressures initially established in the compression springs. This is also made possible by the above described unique relation of parts wherein the piston can be readily removed from the outwardly facing bore of the compressed air cylinder while still retaining the compression springs confined between the cylinder head and the non-rotating shiftable brake plate.

Other objects, features and advantages of the invention will appear from the following detail description of one preferred embodiment thereof. In the accompanying drawings illustrating such embodiment:

Figure 3 is a fragmentary longitudinal sectional view taken approximately on the plane of the line 3—3 of Figure 2.

Figure 1:
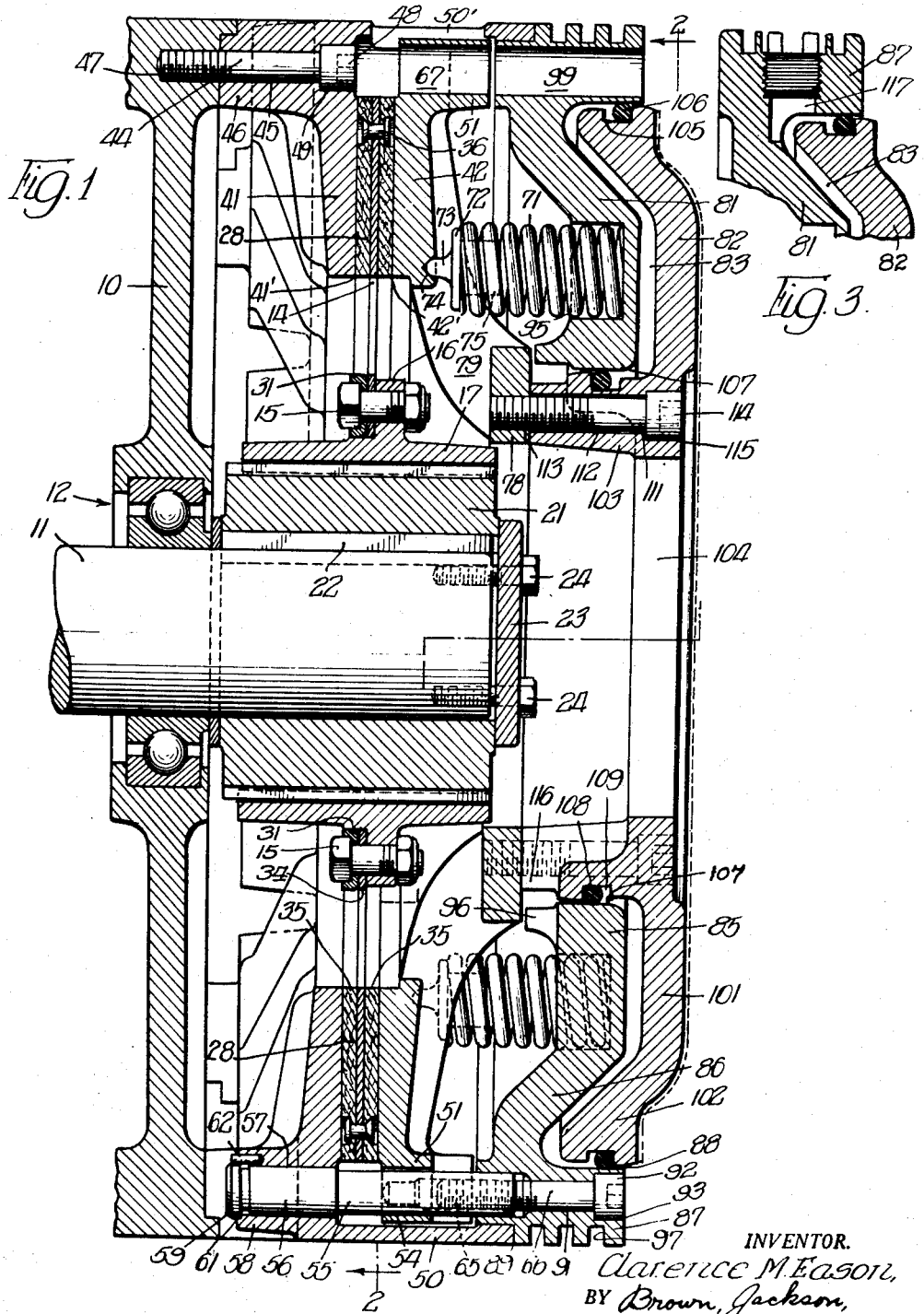
Figure 1 is a substantially axial sectional view through the brake mechanism, taken approximately on the plane of the line 1—1 of Figure 2.

In Figure 1, the frame structure designated 10 at the left hand side of the figure is intended to represent the frame of any machine or device to which a compressed air operated friction brake mechanism would have useful application, such as a forming press, punch press, dieing machine or the like. The rotating shaft upon which the brake mechanism is to exert braking retardation or braking force is indicated at 11. One end of said shaft is shown projecting beyond the frame 10 for mounting the brake mechanism, and this end of the shaft is usually or preferably journaled in the frame on a suitable bearing, typically illustrated by the anti-friction bearing 12.

Figure 2:
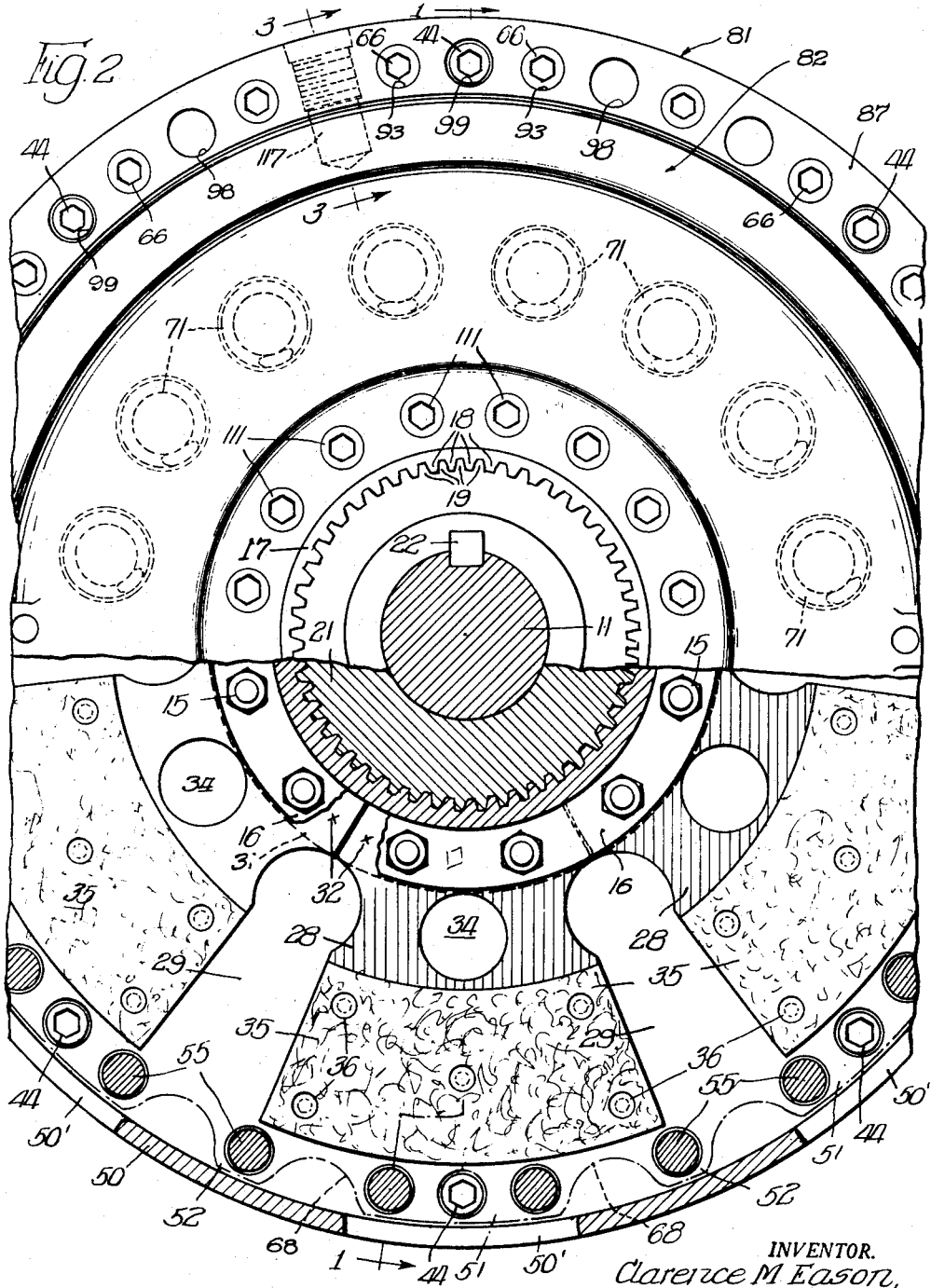
Figure 2 is a fragmentary end view of the brake mechanism, with the upper half in elevation and the lower half in section, corresponding approximately to a view taken on the plane of the line 2—2 of Figure 1.

The preferred embodiment of brake mechanism herein disclosed is of the spring engaged, air released type arranged to act upon a rotating friction brake disk 14 which is keyed to the shaft 11 to rotate therewith at all times. This friction brake disk 14 is secured by bolts 15 to the outwardly extending flange 16 of a freely slidable hub 17. As shown in Figure 2, the bore of this slidable hub 17 consists of a series of inwardly facing splines 18 which mesh with a series of outwardly facing splines 19 formed on the exterior of a non-shiftable main mounting hub 21. This main hub is keyed to the shaft 11 by a main drive key 22, or by splines, as desired, and is shown as being held in place on the shaft 11 by an end cap 23 which overlies the front end of the hub 21 and is secured to the shaft by the cap screws 24.

The rotatable brake disc 14 may be constructed in the form of a solid, one-piece disc, if desired, but I find that better cooling action is obtained by constructing it in the form of a plurality of separate segments 28 having cooling slots 29 therebetween, as shown in Figure 2. The several segments 28 are secured to a channel-shaped mounting ring 31, preferably by welding the inner portion of each segment to such ring, as indicated at 32. One or more additional ventilating holes 34 may be provided in the inner web portion of each segment 28 for increasing the circulation of air through the brake assembly. Secured to the opposite faces of each of these segments 28, outwardly of the ventilating holes 34, are segment-shaped pieces of friction brake material 35. These frictional brake facings 35 are secured to the segments 28 by the rivets 36, it being understood that in the operation of renewing the friction brake facings 35 the rivets 36 are cut out, and then replaced by new rivets pressing through the new facings. The bolts 15 which secure the brake disc 14 to the shiftable hub 17 have their inner heads seating in the circular channel ring 31 between the edge flanges thereof.

The braking action is performed by compressing or gripping the rotating brake disc 14 between the non-rotatable inner and outer brake plates 41 and 42, these having flat disc-like brake surfaces 41' and 42' adapted to bear against the frictional brake facings 35 on the disc segments. The inner brake plate or disc 41 is stationarily secured to the housing 10 by a series of angularly spaced screws 44 which pass through holes 45 in angularly spaced bosses 46 formed integrally with the brake plate 41. The threaded inner ends of these screws 44 screw into tapped holes 47 in the housing 10. The screws 44 have socket heads 48 which are received in counterbores 49 formed at the outer ends of the main bores 45. The stationary inner brake plate 41 is also formed with an outer cylindrical mounting flange 50 which extends forwardly for centering and mounting the compressed air cylinder, as will be later described. This mounting flange 50 has angularly spaced ventilating holes 50' therein, as best shown in Figure 2.

The outer brake plate 42 is mounted for axial shifting movement relatively to the non-shiftable inner brake plate 41. Formed around the outer periphery of the shiftable brake plate 42 are apertured flange segments 51 and 52, which are best shown in Figure 2. Formed in the flange segments 51 are angularly spaced guide holes 54 adapted to have guided sliding movement over guide bushings 55 projecting outwardly from the non-shiftable inner brake plate 41. Enlarged inner portions 56 of these guide bushings 55 are seated in bores 57 formed in bosses 58 projecting inwardly from the inner brake plate 41. The bosses 58 do not project inwardly as far as the bosses 46, thereby leaving space for enlarged heads 59 on the inner ends of the guide bushings, such heads seating in shallow counterbores 61 in the bosses 58. These guide bushings are locked against rotation in their bores by short keying pins 62 which are driven into offset recesses in the bosses 58 and engaged in peripheral notches in the bushing heads 59. The outer end of each guide bushing 55 is provided with a threaded bore 65 for receiving a fastening screw 66 passing inwardly through the wall or skirt portion of the compressed air cylinder, as will be later described.

Formed in the flange segments 51 are apertures 67 (Figure 1) through which the inner mounting screws 44 may be passed when securing the stationary inner brake plate 41 to the housing or frame 10. The previously described guide holes 54 which have a sliding fit on the guide bushings 55 are formed in both flange segments 51 and 52. The notch-like spaces 68 between the ends of adjacent flange segments 51 and 52 also afford ventilating passageways through which the air may circulate for cooling the brake mechanism.

The shiftable outer brake plate 42 is normally urged into frictional braking engagement with the brake disc 14 by a series of angularly spaced compression springs 71. The inner end of each spring has thrust transmitting engagement with the shiftable brake plate 42 through a thrusting head 72 having a spherical inner end 73 seating in a recess 74 formed in the outer surface of the brake plate 42. The end of the compression spring 71 fits over a reduced shank portion 75 projecting outwardly from the thrusting head 72. The outer end of each compression spring 71 bears against the compressed air cylinder head, as will be later described. In the operation of releasing the brake, the shiftable brake plate 42 is retracted or pulled in an outward direction against the pressure of the springs 71 through the medium of a retracting ring 78 and angularly spaced spider arms 79 which are preferably cast as an integral part of the brake plate 42. The retracting ring 78 is secured to the piston of the compressed air power unit.

Referring now to the details of this compressed air power unit, it comprises two relatively shiftable or separable elements 81 and 82 between which is defined the chamber area 83 for receiving the compressed air that causes relative separating movement. The innermost element 81 is secured fast against shifting movement, whereas the outermost element 82 is shiftable inwardly and outwardly relatively thereto, as indicated by the full line position and the dotted line position in Figure 1. The two elements have an inverted relation, according to which either one might be considered the cylinder and the other the piston, but inasmuch as the inner element 81 is non-shifting and has a short outer cylinder wall enveloping the element 82, I have chosen to term the element 81 as the cylinder and the element 82 as the piston. The cylinder element 81 comprises a radially extending inner web or hub portion 85, a diagonal web portion 86 and an outwardly projecting flange portion 87 having an inner cylindrical surface 88 constituting a cylinder wall. The relatively long mounting flange 50 projecting forwardly from the stationary inner brake 41 is adapted to seat in a peripheral recess 89 formed in the rear edge of the outer flange 87. The series of outer mounting screws 66 pass through bores 91 in the cylinder flange 87 and screw into the guide bushings 55. These outer mounting screws 66 are preferably of the type having socket heads 92 fitting into counterbores 93 in the cylinder flange. It will be seen that the mounting flange 50 and mounting screws 66 rigidly secure the cylinder 81 to the stationary inner brake plate 41. The outer ends of the compression springs 71 seat in separate circular pockets 95 formed at angularly spaced points in the radial web portion 85 of the cylinder. Projecting in an inward direction from the inner portion of this radial web portion 85 are angularly spaced stop lugs 96 adapted to form stop abutments to be engaged by the outer surface of the retracting ring 78 for limiting the outward retracting movement of the shiftable brake plate 42, responsive to piston operation. Heat dissipating grooves or flanges 97 may be formed around the outer surface of the outer cylinder flange 87. Also extending longitudinally through this outer cylinder flange 87 are ventilating apertures 98, and additional apertures 99 for passing the cap screws 44, the latter apertures 99 likewise providing for additional circulation of air.

Referring now to the piston element 82, this comprises a radially extending web portion 101, an inwardly inclined rim portion 102 and a central hub portion 103, the latter being provided with a relatively large central opening 104 which affords ready access to the cap screws 24 and also facilitates a large inflow of air for outward circulation through the brake parts. The rim portion of the piston is formed with a relatively wide peripheral groove 105 in which is seated an O-type of sealing ring 106 composed of neoprene, or the like. This neoprene sealing ring is adapted to have sliding or rolling contact along the surface of the relatively short cylinder wall 88.

The central hub portion 103 of the piston passes entirely through a central through-opening 107 of cylindrical form provided in the cylinder head 85. A sealed joint is maintained between these two by an inner sealing ring 108 mounted in an annular groove 109 in the hub 103 and having sliding or rolling contact with the inner cylindrical surface or wall of the central opening 107. The ring 108 is also preferably an O-type of neoprene ring, but it will be understood that other types of sealing rings or packings may be employed at both the inner and outer joints of the piston.

The piston is detachably secured to the retracting ring 78 by an inner series of screws 111 passing through bores 112 in the hub 103 and having their threaded inner ends screwing into tapped bores 113 in the retracting ring 78. These inner screws 11 are also preferably of the type having socket heads 114 adapted to be received in counterbores 115 formed in the hub of the piston. Formed at angularly spaced points in this hub 103 are radially extending ventilating apertures 116. The brake is shown in its engaged position in which the total pressure of the several springs 71 is holding the brake plate 42 shifted inwardly with the rotatable brake disc 14 compressed between the two brake plates 41 and 42. It will be obvious that when the compressed air is admitted into the cylinder space 83 the piston 82 will be shifted outwardly approximately to its dotted line position, as defined by the abutment of the retracting ring 78 against the abutment stops 96, in which position the outer brake plate 42 will be retracted from the brake disc 14, permitting the latter to rotate freely.

Air admission into the cylinder space 83 may be arranged in any suitable manner and at any suitable point, one typical arrangement being illustrated in Figure 3. In this arrangement, an air inlet passageway 117 is cored or drilled radially inwardly through the outer cylinder flange 87 to intersect the cylinder space 83, the outer portion of this passageway being threaded for receiving any suitable coupling nipple or the like communicating with the compressed air control valve.

When it is desired to inspect, clean or renew the segments of friction facing material 35 on the brake disc segments 28, it is only necessary to unscrew the outer mounting screws 66 from their engagement in the threaded bores 65 of the guide bushings 55. Thereupon, the entire sub-assembly consisting of the outer shiftable brake plate 42, the compressed air cylinder 81, the compression springs 71 interposed therebetween, and the outwardly disposed piston 82, can be withdrawn endwise out of its mounted position in the mounting flange 50. In such removal of this sub-assembly, it is impossible for the initially stored energy in the springs 71 to become released because these springs are confined between the shiftable brake plate 42 and cylinder 81, and the cylinder 81 cannot escape from the brake plate 42 because it is tied between the brake plate 42 and piston 82 by the series of inner attaching screws 111. After the removal of this sub-assembly, the rotatable brake disc 14 can be readily removed either by sliding the splined hub 17 off the main mounting hub 21, or by pulling the main mounting hub 21 off the end of the shaft 11. When replacing the sub-assembly comprising the parts 42, 81 and 82, the tightening of the outer mounting screws 66 restores the parts to their original positions and restores the original compression pressures to the springs 71.

Whenever it is desired to inspect, clean or renew either of the neoprene sealing rings 106 or 108, it is only necessary to unscrew the inner attaching screws 111 from their engagement in the threaded bores 113 in the retracting ring 78. Thereupon, the piston 82 with its two sealing rings 106 and 108 can be slid endwise out of the cylinder for ready inspection or replacement of the sealing rings. When the piston is thus removed from the assembly, the cylinder 81 is still held in its assembled position by the outer mounting screws 66, so that the removal of the piston does not release or affect the springs 71.

A further advantage of keeping the compression springs confined in the above operations is that if the springs are allowed to get out of place in the operation of renewing the brake facings or renewing the sealing rings, the device can never be reassembled on the machine with the axis of the brake disposed horizontally. The entire brake mechanism then has to be taken off the drive shaft and reassembled with the device resting on a horizontal surface, so that the axis of the brake mechanism extends vertically. Only in this position can the springs be made to stay in their proper positions in the reassembly operation.

The fewness of parts and the simplicity of construction and operation are illustrated by the unique relation, wherein: (1) the stationary brake plate 41 and stationary cylinder 81 are joined together by the screws 66 in the form of a stationary assembly of U-shaped cross section with the open end of the U facing radially inwardly; and wherein, (2) the shiftable brake plate 42 and shiftable piston 82 are joined together by the screws 111 in the form of a shiftable assembly of U-shaped cross section with the open end of the U facing radially outwardly; and wherein, (3) the two U-shaped assemblies have an interfitting relation, with the shiftable brake plate 42 of the shiftable assembly disposed between the stationary brake plate 41 and the stationary cylinder 81 of the stationary assembly.

The previously described air ventilating openings and passageways, and the segmental form of the rotatable brake disc, effectively dissipate heat and prevent overheating under heavy duty service.

While I have illustrated and described what I regard to be the preferred embodiment of my invention, nevertheless it will be understood that such is merely exemplary and that numerous modifications and rearrangements may be made therein without departing from the essence of the invention.

I claim:

1. In air operated brake mechanism of the class described for stopping the rotary motion of a driven shaft or the like, the combination of a brake disc rotating with said shaft, two coacting brake plates, one on each side of said brake disc, one of said brake plates being axially shiftable, spring means normally tending to shift said latter plate in one direction, and an air operated cylinder and piston combination operative to shift said shiftable brake plate in the opposite direction in opposition to the action of said spring means, said cylinder and piston combination comprising a cylinder having an inner head portion provided with a central aperture therein and an outwardly facing cylinder bore, a piston mounted to move outwardly in said bore upon the admission of compressed air between said cylinder head and piston, and means operatively connecting said piston with said shiftable brake plate through the central aperture in said cylinder head.

2. In air operated brake mechanism of the class described for stopping the rotary motion of a driven shaft or the like, the combination of a brake disc rotating with said shaft, two coacting brake plates, one on each side of said brake disc, one of said brake plates being axially shiftable, spring means normally tending to shift said latter plate in one direction, and a compressed air power unit comprising a cylinder and piston operative to shift said shiftable brake plate in the opposite direction in opposition to the action of said spring means, said cylinder being formed with an outer cylinder wall and being formed with a central aperture having an inner cylindrical wall, an outer sealing ring associated with said piston and engaging said outer cylinder wall, an inner sealing ring associated with said piston and engaging said inner cylindrical wall, and means establishing a motion transmitting connection between said piston and said shiftable brake plate through said central aperture in the cylinder.

3. In air operated brake mechanism of the class described for stopping the rotary motion of a driven shaft or the like, the combination of a brake disc rotating with said shaft, two coacting brake plates, one on each side of said brake disk, one of said brake plates being axially shiftable, spring means normally tending to shift said latter plate in one direction, and a compressed air power unit comprising a cylinder and piston operative to shift said shiftable brake plate in the opposite direction in opposition to the action of said spring means, said cylinder comprising a cylinder head formed adjacent its outer periphery with an outwardly extending outer cylinder wall and formed adjacent its center with a central through-aperture having an inner cylindrical wall, an outer sealing ring associated with said piston and engaging said outer cylinder wall, an inner sealing ring associated with said piston and engaging said inner cylindrical wall, a motion transmitting connection between said piston and said shiftable brake plate operating through the central aperture in said cylinder, and releasable screw means permitting the ready disconnection of said motion transmitting connection for separating the piston from said cylinder.

4. In air operated brake mechanism of the class described for controlling the rotary motion of a driven shaft or the like, the combination of a brake disc rotating with said shaft, two coacting brake plates, one on each side of said brake disc, one of said brake plates being non-shiftable and the other being axially shiftable, spring means normally tending to shift said latter plate in one direction, a compressed air cylinder disposed outwardly of said brake plates, releasable screw means for releasably fastening said cylinder to said non-shiftable brake plate, said cylinder comprising a cylinder head formed adjacent its outer periphery with an outer cylinder wall and formed adjacent its center with a central aperture having an inner cylindrical wall, a piston coacting with said cylinder, an outer sealing ring associated with said piston and engaging said outer cylinder wall, an inner sealing ring associated with said piston and engaging said inner cylindrical wall, and means establishing a motion transmitting connection between said piston and said shiftable brake plate through the central aperture in said cylinder head.

5. In air operated brake mechanism of the class described for controlling the rotary motion of a driven shaft or the like, the combination of a brake disc rotating with said shaft, two coacting brake plates, one on each side of said brake disc, one of said brake plates being non-shiftable and the other being axially shiftable, spring means normally tending to shift said latter plate in one direction, a compressed air cylinder disposed outwardly of said brake plates, releasable screw means for releasably fastening said cylinder to said non-shiftable brake plate, said cylinder comprising a cylinder head formed adjacent its outer periphery with an outer cylinder wall and formed adjacent its center with a central aperture having an inner cylindrical wall, a piston coacting with said cylinder, an outer sealing ring associated with said piston and engaging said outer cylinder wall, an inner sealing ring associated with said piston and engaging said inner cylindrical wall, a motion transmitting connection between said piston and said shiftable brake plate operating through the central aperture in said cylinder head, and releasable screw means permitting the ready disconnection of said motion transmitting connection for separating the piston from said cylinder.

6. In air operated brake mechanism of the class described for controlling the rotary motion of a driven shaft or the like, the combination of a brake disc rotating with said shaft, a non-shiftable brake plate mounted on the inner side of said brake disc, an axially shiftable brake plate mounted on the outer side of said brake disc, a compressed air cylinder mounted on the outer side of said axially shiftable brake plate, compression springs confined between said cylinder and said shiftable brake plate normally tending to shift the latter into braking engagement with said brake disc, said cylinder being formed adjacent its outer periphery with an outer cylinder wall and being formed adjacent its center with a central aperture having an inner cylindrical wall, a piston disposed outwardly of said cylinder, an outer sealing ring associated with said piston and engaging said outer cylinder wall, an inner sealing ring associated with said piston and engaging said inner cylindrical wall, and means establishing a motion transmitting connection between said piston and said shiftable brake plate through said central aperture in the cylinder.

7. In air operated brake mechanism of the class described for controlling the rotary motion of a driven shaft or the like, the combination of a brake disc rotating with said shaft, a non-shiftable brake plate mounted on the inner side of said brake disc, an axially shiftable brake plate mounted on the outer side of said brake disc, a compressed air cylinder disposed outwardly of said axially shiftable brake plate, releasable screw means for releasably fastening said cylinder to said non-shiftable brake plate, compression springs confined between said cylinder and said shiftable brake plate normally tending to shift the latter into braking engagement with said brake disc, said cylinder having a central aperture extending therethrough, a piston coacting with said cylinder, a motion transmitting connection between said piston and said shiftable brake plate operating through the central aperture in said cylinder, and releasable screw means permitting the ready disconnection of said motion transmitting connection.

8. In air operated brake mechanism of the class described for controlling the rotary motion of a driven shaft or the like, the combination of a brake disc rotating with said shaft, a non-shiftable brake plate mounted on the inner side of said brake disc, an axially shiftable brake plate mounted on the outer side of said brake disc, a compressed air cylinder disposed outwardly of said axially shiftable brake plate, releasable screw means for releasably fastening said cylinder to said non-shiftable brake plate, said cylinder comprising a cylinder head formed adjacent its outer periphery with an outwardly projecting outer cylinder wall and formed adjacent its center with a central through aperture having an inner cylindrical wall, a piston coacting with said cylinder, an outer sealing ring associated with said piston and engaging said outer cylinder wall, an inner sealing ring associated with said piston and engaging said inner cylindrical wall, and means establishing a motion transmitting connection between said piston and said shiftable brake plate through the central aperture in said cylinder head.

9. In air operated brake mechanism of the class described for controlling the rotary motion of a driven shaft or the like, the combination of a brake disc rotating with said shaft, a non-shiftable brake plate mounted on the inner side of said brake disc, an axially shiftable brake plate mounted on the outer side of said brake disc, a compressed air cylinder disposed outwardly of said axially shiftable brake plate, releasable screw means for releasably fastening said cylinder to said non-shiftable brake plate, said cylinder comprising a cylinder head formed adjacent its outer periphery with an outwardly projecting outer cylinder wall and formed adjacent its center with a central through aperture having an inner cylindrical wall, a piston coacting with said cylinder, an outer sealing ring associated with said piston and engaging said outer cylinder wall, an inner sealing ring associated with said piston and engaging said inner cylindrical wall, a motion transmitting connection between said piston and said shiftable brake plate operating through the central aperture in said cylinder head, and releasable screw means permitting the ready disconnection of said motion transmitting connection for separating the piston from said cylinder.

10. In air operated brake mechanism of the class described for controlling the rotary motion of a driven shaft or the like, the combination of a brake disc rotating with said shaft, two coacting brake plates, one on each side of said brake disc, one of said brake plates being axially shiftable, spring means normally tending to shift said latter plate in one direction, and a compressed air power unit for shifting said shiftable brake plate in the opposite direction in opposition to the action of said spring means, said power unit comprising an inner power member and an outer power member between which compressed air is adapted to be admitted, means for securing said inner power member to said non-shiftable brake plate, said inner power member having a central aperture therethrough, and means establishing a motion transmitting connection between said outer power member and said shiftable brake plate through said central aperture in the inner power member.

11. In air operated brake mechanism of the class described for stopping the rotary motion of a driven shaft or the like, the combination of a brake disc rotating with said shaft, two coacting brake plates, one on each side of said brake disc, one of said brake plates being non-shiftable and the other being axially shiftable, spring means normally tending to shift said shiftable plate in the direction to engage said brake, and a compressed air power unit for shifting said shiftable brake plate in the opposite direction to release the brake engagement, said power unit comprising an inner power member and an outer power member between which compressed air is adapted to be admitted, releasable screw means for releasably fastening said inner power member to said non-shiftable brake plate, said inner power member having a central aperture therethrough, a motion transmitting connection between said outer power member and said shiftable brake plate operating through said central aperture, and releasable screw means permitting a ready disconnection of said motion transmitting connection for permitting relative separation of said two power members.

12. In air operated brake mechanism of the class described for stopping the rotary motion of a driven shaft or the like, the combination of a brake disc rotating with said shaft, a stationary inner brake plate adapted for attachment to a stationary supporting structure on the inner side of said brake disc, stationary inner mounting screws for securing said brake plate to said supporting structure, said stationary inner brake plate comprising an outwardly extending mounting flange, an axially shiftable brake plate disposed outwardly of said brake disc, guide bushings carried by said stationary inner brake plate engaging in guide apertures in said shiftable brake plate for guiding the shifting movement of the latter, a compressed air power cylinder disposed outwardly of said shiftable brake plate and supported by said mounting flange of said inner brake plate, releasable screw means passing through said power cylinder and threading into tapped bores in said guide bushings, compression springs confined between said power cylinder and said shiftable brake plate normally tending to shift the latter into braking engagement, said cylinder having a central aperture extending therethrough, a piston coacting with said cylinder, and means establishing a motion transmitting connection between said piston and said shiftable brake plate through said central aperture in the cylinder.

13. In air operated brake mechanism of the class described for controlling the rotary motion of a driven shaft or the like rotatably supported in a supporting frame structure, the combination of a brake disc rotating with said shaft, a stationary inner brake plate disposed between said brake disc and said supporting frame structure, inner fastening screws for fastening said inner brake plate to said supporting structure, a free floating hub mounted on said shaft supporting said brake disc for free floating shifting movement, a mounting flange projecting outwardly from said inner brake plate, an axially shiftable brake plate disposed outwardly of said brake disc, guide bushings carried by said inner brake plate engaging in guide apertures in said outer brake plate for guiding the latter in its axial shifting movement, said shiftable outer brake plate comprising spider arms terminating in a retracting ring, a compressed air power cylinder carried by said mounting flange, releasable outer fastening screws passing through said compressed air cylinder and screwing into tapped bores in said guide bushings, compression springs confined between said cylinder and said outer shiftable brake plate normally tending to shift said latter plate into braking engagement, said cylinder having a central aperture therethrough, a piston coacting with said cylinder, said piston comprising a central boss portion extending inwardly through the central aperture in said cylinder, and releasable inner fastening screws passing through said boss and threading into said retracting ring of said shiftable brake plate.

14. In air operated brake mechanism of the class described for controlling the rotary motion of a driven shaft or the like rotatably supported in a supporting frame structure, the combination of a brake disc rotating with said shaft, a stationary inner brake plate disposed between said brake disc and said supporting frame structure, inner fastening screws for fastening said inner brake plate to said supporting structure, a free floating hub mounted on said shaft supporting said brake disc for free floating shifting movement, a mounting flange projecting outwardly from said inner brake plate, an axially shiftable brake plate disposed outwardly of said brake disc, guide bushings carried by said inner brake plate engaging in guide apertures in said outer brake plate for guiding the latter in its axial shifting movement, said shiftable outer brake plate comprising spider arms terminating in a retracting ring, a compressed air power cylinder carried by said mounting flange, releasable outer fastening screws passing through said compressed air cylinder and screwing into tapped bores in said guide bushings, compression springs confined between said cylinder and said outer shiftable brake plate normally tending to shift said latter plate into braking engagement, said cylinder comprising a cylinder head formed adjacent its outer periphery with an outer cylinder wall and formed adjacent its center with a central through aperture having an inner cylindrical wall, a piston coatcing with said cylinder, an outer sealing ring carried by the outer portion of said piston and engaging with said outer cylinder wall, said piston comprising a central boss portion projecting inwardly through the central aperture of said cylinder head, an inner sealing ring mounted on said central boss and engaging with the inner cylindrical wall of said central aperture, and an inner series of releasable screws passing through the central boss of said piston and tapping into threaded bores in the retracting ring of said shiftable outer brake plate.

15. In air operated brake mechanism, the combination of a rotatable brake element, a stationary brake plate on one side thereof, a shiftable brake plate on the other side thereof, spring means acting on said shiftable brake plate, a stationary compressed air cylinder, and a shiftable piston cooperating with said cylinder, said stationary brake plate and said statonary cylinder being joined together in the form of a stationary assembly of U-shaped cross section with the open end of the U facing radially inwardly, said shiftable brake plate and said shiftable piston being joined together in the form of a shiftable assembly of U-shaped cross section with the open end of the U facing radially outwardly, said two U-shaped assemblies having an interfitting relation with the shiftable brake plate of the shiftable assembly disposed between the stationary brake plate and the stationary cylinder of the stationary assembly.

No references cited.